US012550080B2

(12) United States Patent
Monajemi et al.

(10) Patent No.: US 12,550,080 B2
(45) Date of Patent: Feb. 10, 2026

(54) TRANSMIT POWER CONTROL DESIGN FOR MAKE-BEFORE-BREAK ROAMING DEPLOYMENTS

(71) Applicant: Cisco Technology, Inc., San Jose, CA (US)

(72) Inventors: Pooya Monajemi, San Jose, CA (US); Vishal S. Desai, San Jose, CA (US); Malcolm M. Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 289 days.

(21) Appl. No.: 18/177,041

(22) Filed: Mar. 1, 2023

(65) Prior Publication Data

US 2024/0298275 A1 Sep. 5, 2024

(51) Int. Cl.
| | |
|---|---|
| *H04W 52/38* | (2009.01) |
| *H04W 16/24* | (2009.01) |
| *H04W 52/22* | (2009.01) |
| *H04W 52/36* | (2009.01) |
| *H04W 72/54* | (2023.01) |

(52) U.S. Cl.
CPC .......... *H04W 52/38* (2013.01); *H04W 16/24* (2013.01); *H04W 52/223* (2013.01); *H04W 52/367* (2013.01); *H04W 72/54* (2023.01)

(58) Field of Classification Search
CPC ..... H04W 52/38; H04W 72/54; H04W 16/24; H04W 52/223; H04W 52/367
USPC ........................................................ 455/522
See application file for complete search history.

(56) References Cited

U.S. PATENT DOCUMENTS

| | | | |
|---|---|---|---|
| 7,239,619 B2 * | 7/2007 | Tobe | H04W 52/40 |
| | | | 455/436 |
| 2015/0079988 A1 | 3/2015 | Su et al. | |
| 2015/0141027 A1 | 5/2015 | Tsui et al. | |
| 2019/0199571 A1* | 6/2019 | John Wilson | H04W 52/281 |
| 2019/0364517 A1* | 11/2019 | Gaal | H04W 76/16 |
| 2021/0105678 A1 | 4/2021 | Awoniyi-Oteri et al. | |
| 2021/0410041 A1 | 12/2021 | Alfred et al. | |
| 2022/0174616 A1 | 6/2022 | Hsieh et al. | |
| 2023/0291671 A1* | 9/2023 | Narula | H04W 72/0453 |

* cited by examiner

*Primary Examiner* — Michael R Neff
(74) *Attorney, Agent, or Firm* — Patterson + Sheridan, LLP (57) ABSTRACT

Systems and techniques for performing transmit power control for facilitating multi-band make-before-break (MBB) roaming are described. An example technique includes identifying a first access point communicating on a first band within a first cell. A second access point communicating on a second band within a second cell neighboring the first cell is identified. A target overlap between the first band and the second band is created.

20 Claims, 5 Drawing Sheets

TRANSMIT POWER CONTROL DESIGN FOR MAKE-BEFORE-BREAK ROAMING DEPLOYMENTS

TECHNICAL FIELD

Embodiments presented in this disclosure generally relate to communication networks and, more specifically, to transmit power control for facilitating multi-band make-before-break (MBB) roaming deployments.

BACKGROUND

Make-before-break roaming (MBBR) is the concept of a moving client device initiating communication with a next access point (AP) (e.g., neighbor AP) while still in contact with the current AP (e.g., serving AP), allowing the client device to maintain connectivity. In one example, a multi-link device (MLD) (e.g., a client device) that is operating in (multi-band) MBBR may choose to maintain a first link with one AP and a second link with another AP, where the APs are separated by a local area network (LAN), as the MLD moves between the APs. The MLD may maintain the first link using a first radio operating on a first band (e.g., 2.4 gigahertz (GHz) band) and may maintain the second link using a second radio operating on a second band (e.g., 5 GHz band). Such MBBR deployments may present challenges for transmit power control (TPC) algorithm designs.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure provides a computer-implemented method. The computer-implemented method includes identifying a first access point communicating on a first band within a first cell. The computer-implemented method also includes identifying a second access point communicating on a second band within a second cell neighboring the first cell. The computer-implemented method further includes creating a target overlap between the first band and the second band.

Another embodiment presented in this disclosure provides a system. The system includes a memory and a processor communicatively coupled to the memory. The processor is configured to identify a first access point communicating on a first band within a first cell. The processor is also configured to identify a second access point communicating on a second band within a second cell neighboring the first cell. The processor is further configured to create a target overlap between the first band and the second band.

Another embodiment presented in this disclosure provides a computer-readable storage medium. The computer-readable storage medium includes computer executable code, which when executed by one or more processors, performs an operation. The operation includes identifying a first access point communicating on a first band within a first cell. The operation also includes identifying a second access point communicating on a second band within a second cell neighboring the first cell. The operation further includes creating a target overlap between the first band and the second band.

Example Embodiments

The present disclosure provides systems, devices, and techniques for transmit power control for facilitating multi-band make-before-break roaming (MBBR) deployments. For example, multi-band make-before-break (MBB) roaming behavior may present challenges with transmit power control (TPC) algorithm design. For instance, conventional TPC generally aims to adjust cell sizes between neighboring APs' radios operating on the same band. However, conventional TPC may be insufficient for multi-band MBBR deployments in which a moving client device may maintain connectivity with multiple APs using different radios operating on different bands.

As such, embodiments described herein provide a transmit power control design that allows for adjusting cell sizes in order to achieve cell overlaps between different bands of neighboring APs to facilitate multi-band MBB roaming behavior. In one embodiment described herein, a TPC component (also referred to as TPC logic) is configured to identify a first AP (e.g., AP 1) communicating on a first band (e.g., 5 GHz band) using a first radio and to detect a second AP (e.g., AP 2) communicating a second band (e.g., 6 GHz band) using a second radio. In such an embodiment, the TPC component may adjust at least one of a transmission power of the first AP or a transmission power of the second AP to create a target overlap between the first band and the second band.

The target overlap between multiple bands of neighboring APs that is created using the TPC component may facilitate MBBR deployments. Consider, for example, a scenario in which a multi-link device (e.g., client device) concurrently operates on a first link with the first AP on the first band and on a second link with the second AP on the second band. In such an example, this concurrent operation with multiple APs on different bands may facilitate MBBR roaming by the multi-link device. For example, if the first link fails or otherwise is unavailable, then the multi-link device may continue communicating via the second link with the second AP so that there is no period of interruption. Here, the TPC component can dynamically adjust the target overlap that is created between the multiple bands of neighboring APs to optimize the MBB roaming behavior.

Note, the techniques described herein for performing transmit power control for facilitating multi-band MBBR deployments may be incorporated into (such as implemented within or performed by) a variety of wired or wireless apparatuses (such as nodes). In some implementations, a node includes a wireless node. Such wireless nodes may provide, for example, connectivity to or for a network (such as a wide area network (WAN) such as the Internet or a cellular network) via a wired or wireless communication link. In some implementations, a wireless node may include an AP or a network controller.

Figure 1:
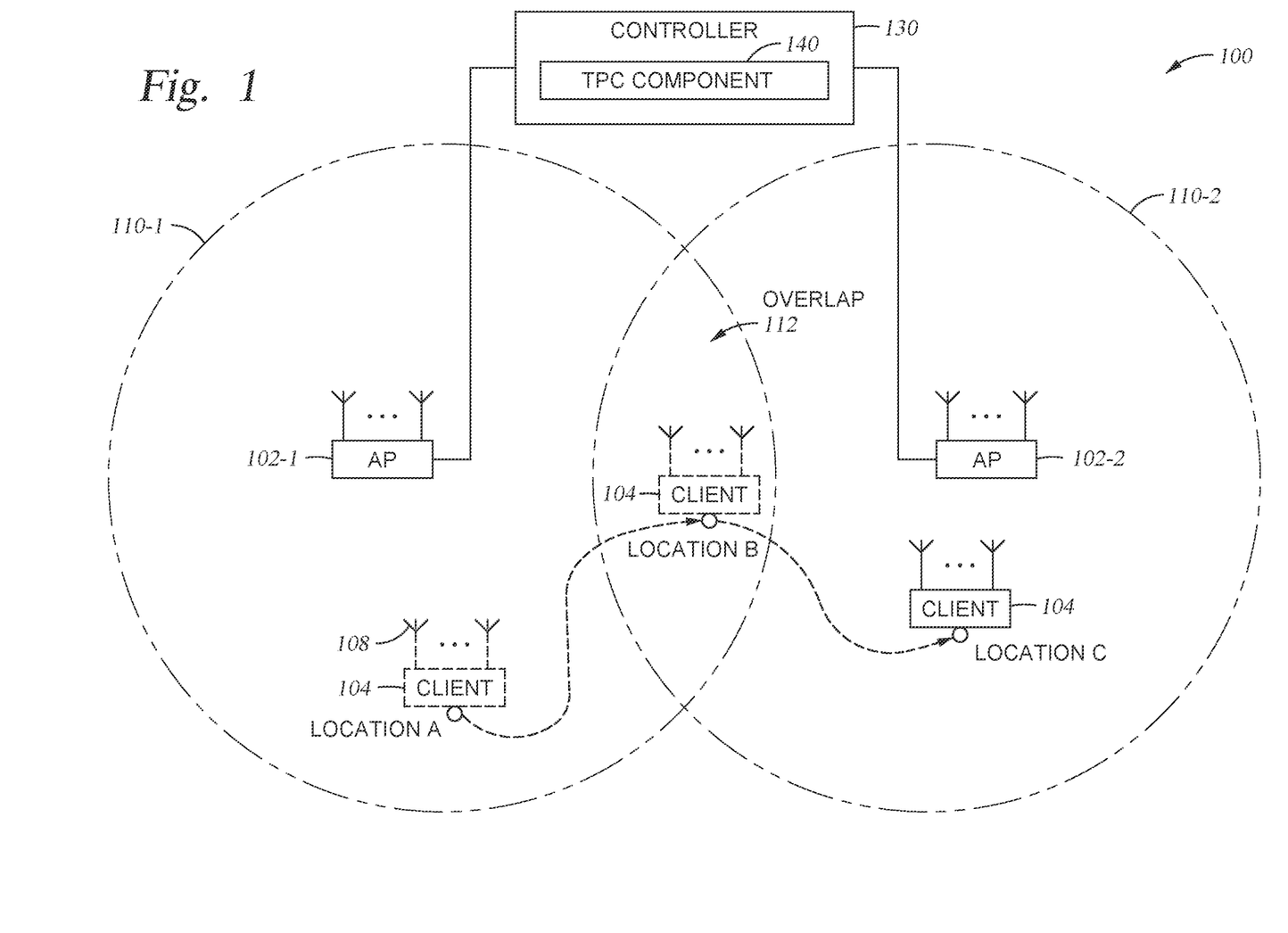
FIG. 1 illustrates an example system, according to one embodiment.

FIG. 1 illustrates an example system 100 in which one or more techniques described herein can be implemented, according to one embodiment. As shown, the system 100 includes an AP 102-1, AP 102-2, and a client STA 104. An AP is generally a fixed station that communicates with client STA(s) and may also be referred to as a base station, wireless device, or some other terminology. A client STA may be fixed or mobile and also may be referred to as a mobile STA, a client, a STA, a wireless device, or some other terminology. Note that while a single client STA 104 is depicted, the system 100 may include any number of client STAs.

As used herein, an AP along with the STAs associated with the AP (e.g., within the coverage area (or cell) of the AP) may be referred to as a basic service set (BSS). Here, AP 102-1 is the serving AP for client STA(s) 104 within cell 110-1. Similarly, AP 102-2 is the serving AP for client STA(s) 104 within cell 110-2. The AP 102-1 and AP 102-2 are neighboring (peer) APs. The APs 102 1-2 may communicate with one or more client STAs 104 on the downlink and uplink. The downlink (e.g., forward link) is the communication link from the AP 102 to the client STAs 104, and the uplink (e.g., reverse link) is the communication link from the client STAs 104 to the AP 102. In some cases, a client STA may also communicate peer-to-peer with another client STA.

In some embodiments, the system 100 supports multi-band MBBR roaming by the client STA(s) 104 among the cells 110 1-2. In a multi-band MBBR deployment, the client STA 104 may form one or more links with one or more of the APs 102 in the system 100. The client STA 104 forms links with the APs 102 to communicate with other networks (e.g., the Internet).

As shown in FIG. 1, the client STA 104 includes one or more radios 108. The client STA 104 uses one or more of the radios 108 to form links with the APs 102. For example, the client STA 104 may use a first radio 108-1 to form a first wireless link with AP 102-1, and the client STA 104 may use a second radio 108-2 to form a second wireless link with AP 102-2. The two wireless links may use different frequency bands. For example, the first wireless link may be formed using a 5 GHz band and the second wireless link may be formed using a 6 GHz band. Note, however, that these are merely example frequency bands and that the two wireless links may use any suitable frequency bands.

In general, the AP(s) 102 and the client STA 104 may form any suitable number of links for communication using any suitable frequencies. In some instances, the client STA 104 may form multiple links with a single AP 102. In other instances, the client STA 104 may form multiple links with multiple APs 104 (e.g., one link with AP 102-1 and another link with AP 102-2). As a result, the client STA 104 may communicate with one or more multiple APs 102 over multiple links using different frequencies. Example hardware that may be included in an AP 102 and a client STA 104 is discussed in greater detail in regard to FIG. 5.

A controller 130 couples to and provides coordination and control for the APs 102 A-B. For example, the controller 130 may handle adjustments to radio frequency power, channels, authentication, and security for the APs. The controller 130 may also coordinate the links formed by the client STA(s) 104 with the APs 102. For example, the controller 130 may coordinate when the client STA 104 and an AP 102 communicate over a link using a particular frequency. As another example, the controller 130 may coordinate the type of data communicated over a particular link. As yet another example, the controller 130 may coordinate when the client STA 104 and the AP 102 form or terminate certain links.

In some embodiments, the controller 130 is included within or integrated with an AP 102 and coordinates the links formed by that AP 102. For example, each AP 102 may include a controller that coordinates the links of that AP. In some embodiments, the controller 130 is separate from the APs 102 and coordinates the links of those APs 102. As shown in FIG. 1, for example, the controller 130 may communicate with the APs 102 1-2 via a (wired or wireless) backhaul. The APs 102 1-2 may also communicate with one another, e.g., directly or indirectly via a wireless or wireline backhaul. Example hardware that may be included in a controller 130 is discussed in greater detail in regard to FIG. 5. Although two APs 102 are depicted for conceptual clarity, in embodiments, the system 100 may include any number of APs 102, each of which may include any number of radios operating with any suitable frequencies.

In some embodiments, the controller 130 includes a TPC component 140, which is configured to perform one or more techniques described herein. As described below, the TPC component 140 may perform transmit power control for facilitating multi-band MBB roaming deployments. The TPC component 140 may include software, hardware, or combinations thereof. Note, the TPC component 140 is described in greater detail below with respect to FIGS. 2, 3, and 4.

Note that the client STA 104 may be referred to as a STA MLD (e.g., a station or client device acting as a multi-link device) and the AP 102 may be referred to as an AP MLD (e.g., an AP that acts as a multi-link device). The STA MLD and AP MLD are generally representative of any device capable of performing multi-link operations. A MLD may generally be classified based on whether it is a single radio MLD or multi-radio MLD. Single radio MLDs generally use a single radio to switch between one or more links. One category of single radio MLDs is Enhanced Multi-Link Single Radio (eMLSR). eMLSR devices generally operate one main wireless radio that can transmit and/or receive data frames on a given link, but can detect some data (e.g., short initial frames) on a set of other links when the device is not actively transmitting or receiving. Multi-radio MLDs may generally be classified into the following two types: (i) simultaneous transmission and reception (STR) MLD and (ii) non-STR MLD. For STR MLDs, a transmission on one link may not affect the operations of frame reception and clear channel assessment (CCA) on other links. Stated differently, for STR MLDs, individual links can operate independently of each other. For non-STR MLDs, operation on one link may be restricted by operation on another link. For example, a transmission on one link may not be allowed if it will cause reception interruption on another link. In another example, a reception or CCA on one link may not be allowed if a transmission is ongoing on another link.

Figure 2:
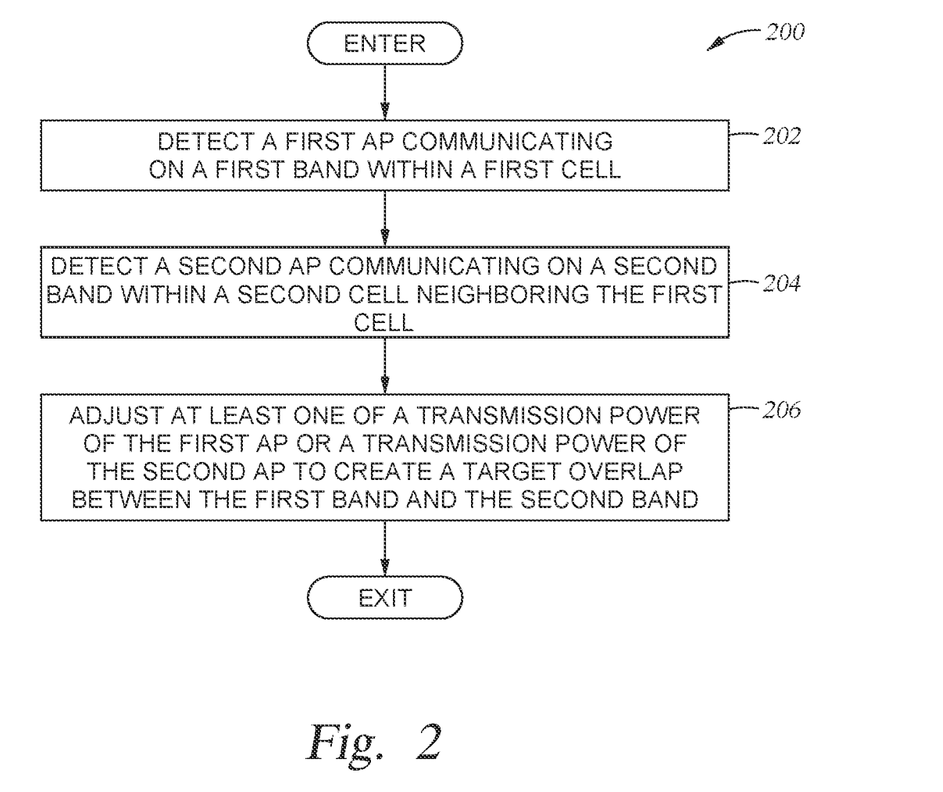
FIG. 2 illustrates a flowchart of a method for transmit power control for facilitating multi-band make-before-break roaming, according to one embodiment.

FIG. 2 is a flowchart of a method 200 for performing transmit power control for facilitating multi-band MBBR deployments, according to one embodiment. The method 200 may be performed by a TPC component (e.g., TPC component 140).

Method 200 enters at block 202, where the TPC component detects a first AP (e.g., AP 102-1) communicating on a first band (e.g., 5 GHz band) within a first cell (e.g., cell 110-1). At block 204, the TPC component detects a second AP (e.g., AP 102-2) communicating on a second band (e.g., 6 GHZ band) within a second cell (e.g., cell 110-2) neighboring the first cell.

At block 206, the TPC component adjusts at least one of a transmission power of the first AP or a transmission power of the second AP to create a target overlap (e.g., overlap 112) between the first band and the second band. Referring to the embodiment depicted in FIG. 1, the TPC component may create the target overlap 112 to facilitate MBB roaming behavior of the client STA 104. For example, when the client STA 104 is in location A, the client STA 104 may associate with the first AP 102-1 and form a first link with the first AP 102-1 on the first band (e.g., 5 GHz band). As the client STA 104 moves from location A to location B, the client STA 104 may also associate with the second AP 102-2 and form a second link with the second AP 102-2 on the second band (e.g., 6 GHZ band).

Thus, in location B, the client STA 104 may have concurrent associations with the first AP 102-1 and the second AP 102-2 on different bands. As the client STA 104 moves from location B to location C, the client STA 104 may be unable to communicate with the first AP 102-1 via the first link but may continue communicating with the second AP 102-2 via the second link. Accordingly, by using the TPC component to dynamically create the overlap 112 between different bands of different cells, the TPC component can optimize the MBB roaming behavior of the client STA among cells.

Figure 3:
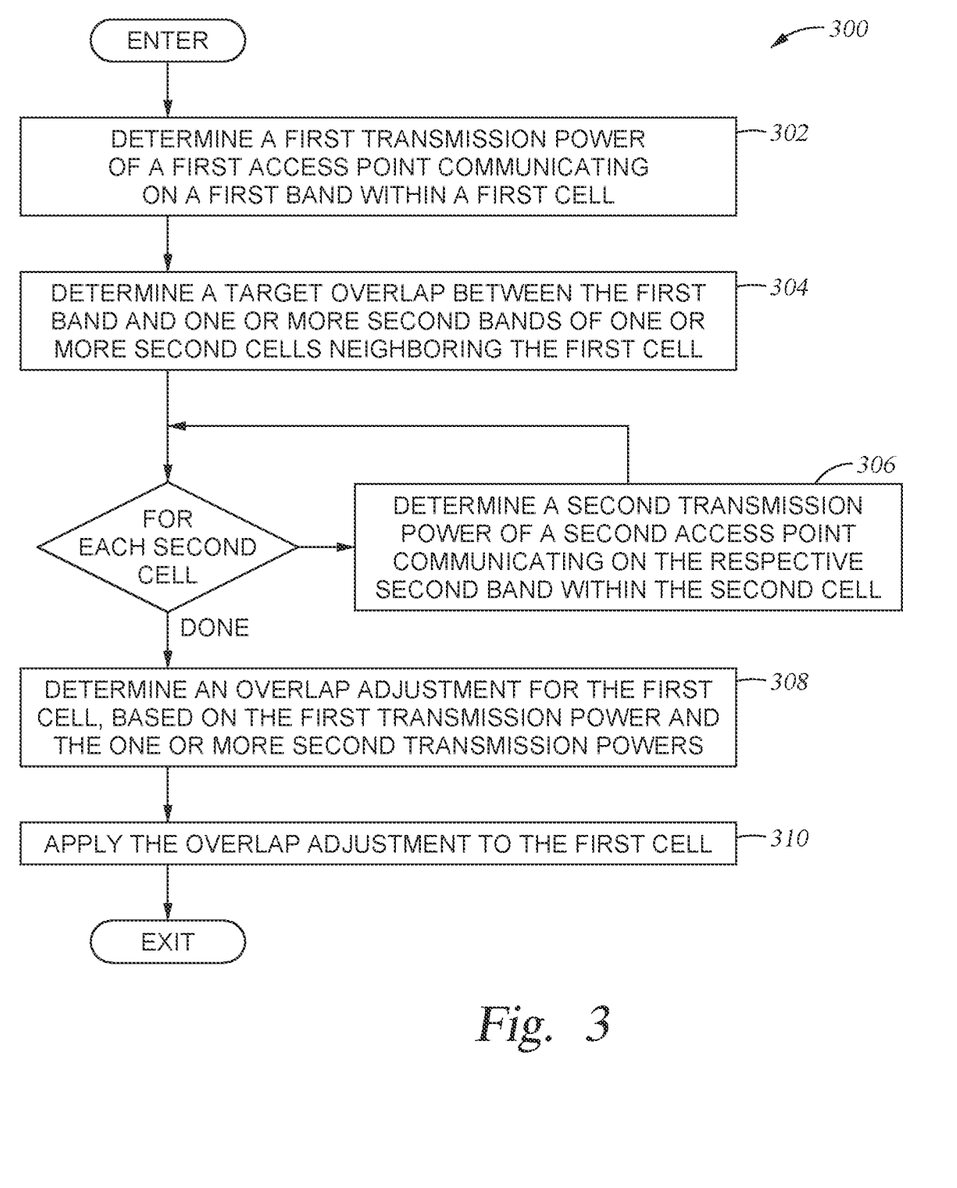
FIG. 3 illustrates a flowchart of another method for transmit power control for facilitating multi-band make-before-break roaming, according to one embodiment.

FIG. 3 is a flowchart of a method 300 for performing transmit power control for facilitating multi-band MBBR deployments, according to one embodiment. The method 300 may be performed by a TPC component (e.g., TPC component 140). In some embodiments, the method 300 may performed as part of the TPC for each cell.

Method 300 enters a block 302, where the TPC component determines a first transmission power of a first AP (e.g., AP 102-1) communicating on a first band (e.g., 5 GHz band) within a first cell (e.g., cell 110-1). At block 304, the TPC component determines a target overlap between the first band and one or more second bands of one or more second cells neighboring the first cell.

For each second cell, the TPC component determines a second transmission power of a second AP (e.g., AP 102-2) communicating on the respective second band (e.g., 6 GHz band) within the second cell (e.g., cell 110-2) (block 306). At block 308, the TPC component determines an overlap adjustment for the first cell, based on the first transmission power and the one or more second transmission powers. At block 310, the TPC component applies the overlap adjustment to the first cell.

In one embodiment, the TPC component (at block 308) may determine the overlap adjustment via a wrapper layer over a transmit power control algorithm that assigns the maximum transmission power (TxP) among the set of the (i) the TxP computed from conventional intra-band TPC and (ii) for each neighboring cell, the TxP required to achieve the target overlap with the neighboring cell's alternate band. For example, for a target AP (e.g., AP 102-1) and N neighboring APs (e.g., APs 102 2-15), the TPC component may determine the overlap adjustment to apply to the target AP using the following Equation (1):

$$\max[\text{TxP computed from TPC for 1st band of AP 102-1, TxP required to achieve target overlap with neighbor AP 102-2's alternate 2nd band, ... TxP required to achieve target overlap with neighbor AP 102-15's alternate } 15^{th} \text{ band}] \quad (1)$$

In the particular embodiment depicted in FIG. 1, the TPC component may determine the overlap adjustment for cell 110-1 using the following: max [TxP computed from TPC for first band in cell 110-1, TxP required to achieve target overlap with second band in cell 110-2].

In one embodiment, if the TXP component is performing cross-band optimization on AP(s) with more than two radios, the value of the TxP required to achieve the target overlap with the neighboring cell's alternate band itself is computed by maximizing over all of the neighboring APs' radios operating on different bands.

In one embodiment, the target overlap value or parameter determined at block 304 may be a configurable value. For example, the target overlap value may be a function of the client STA MLD type (e.g., single radio MLD, eMLSR MLD, STR MLD, non-STR MLD). For instance, the TXP component may use a higher target overlap value when more multi-radio (STR/non-STR) MLD devices are involved in MBBR (e.g., the number of multi-radio MLD devices exceeds a threshold and/or is greater than the number of single-radio MLD devices). On the other hand, the TXP component may use a smaller target overlap value when more single radio or eMLSR MLDs are involved in MBBR (e.g., the number of single radio MLD devices exceeds a threshold and/or is greater than the number of multiple-radio MLD devices).

Note that. in some embodiments, as opposed to using a wrapper layer over the per-band TPC as shown in FIG. 3, the TPC component may perform transmit power control on all bands at the same time. In such embodiments, the TPC may use a same minimum target overlap for transmit power control for all the bands. In some embodiments, the TPC component may use an iterative approach to converge to a target overlap among all the radios on the multiple bands.

In certain embodiments, the TPC component may perform transmit power control for multi-band MBB roaming, based in part on whether a neighbor AP(s) is operating in low power indoor (LPI) mode or standard power (SP) mode in a certain frequency band (e.g., 6 GHz band). SP APs can operate in certain frequency portions (e.g., unlicensed national information infrastructure (U-NII) 5 and U-NII 7 bands) of a frequency band (e.g., 6 GHz band) indoors or outdoors at full power, but operate under the control of an automated frequency coordination (AFC) system. Such an AFC system may maintain a list of frequencies used by incumbent systems in the geographical location of the AP. The AFC system may assign a list of frequencies to the AP, based on where it can operate safely without interfering with any incumbent. In certain embodiments, the AFC system may be located within or communicatively coupled to the controller 130 depicted in FIG. 1.

Compared to SP APs, LPI APs may operate across all frequencies (e.g., U-NII 5, U-NII 6, U-NII 7, and U-NII 8) of a certain frequency band (e.g., 6 GHz band) for indoor operation without the need of AFC, but may have a lower maximum transmit power than SP APs. For example, certain LPI APs may have a maximum allowed equivalent, isotropically radiated power (EIRP) of 30 decibel milliwatts (dBm) or 5 dBM/MHz.

Figure 4:
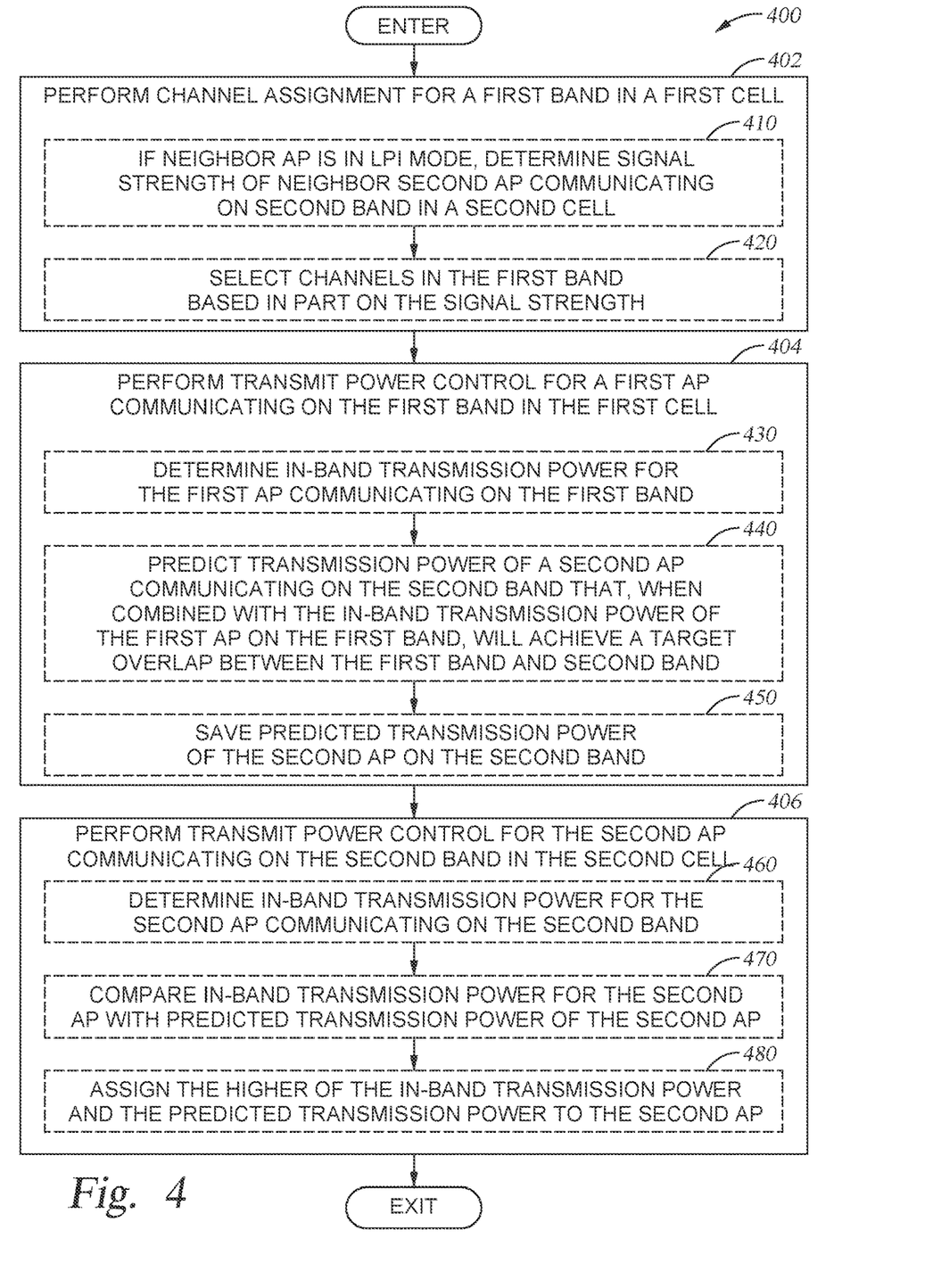
FIG. 4 illustrates a flowchart transmit power control for facilitating multi-band make-before-break roaming, according to one embodiment.

FIG. 4 is a flowchart of a method 400 for performing transmit power control for facilitating multi-band MBBR deployments, according to one embodiment. The method 400 may be performed by a TPC component (e.g., TPC component 140).

Method 400 may enter at block 402, where the TPC component performs channel assignments for a first band (e.g., 5 GHz band) in a first cell. Block 402 includes sub-blocks 410 and 420. At sub-block 410, if a neighbor (second) AP's radio is operating in LPI mode in a second band (e.g., 6 GHz band) in a second cell, then the TPC component determines the signal strength of the neighbor (second) AP communicating on the second band in the second cell. At sub-block 420, the TPC component selects channels in the first band, based in part on the signal strength determined in sub-block 410.

As a reference example, if the neighbor AP's 6 GHz radio is operating in LPI mode and its signal strength (e.g., received signal strength indicator (RSSI)) is below a threshold, then the TPC component may assign the target AP's 5 GHz radio (in the first cell) on channels with the maximum allowed transmit power. In this example, the TPC component may introduce a bias value in the dynamic channel allocation (DCA) for the 5 GHz band in order to select 5 GHz channels with a higher transmit power limit.

At block 404, the TPC component performs transmit power control for a first AP communicating on the first band in the first cell. Block 404 includes sub-blocks 430, 440, and 450. At sub-block 430, the TPC component determines an in-band transmission power for the first AP communicating on the first band. For example, in 5 GHz transmit power control, the TPC component may determine an in-band transmission power using a 5 GHz TPC control algorithm.

At sub-block 440, the TPC component predicts a transmission power of a second AP communicating on the second band that, when combined with the in-band transmission power of the first AP on the first band, will achieve a target overlap between the first band and second band. For example, if the TPC component determines that the combination of the target AP's 5 GHz radio's in-band assigned transmission power and the neighbor AP's 6 GHz's radio's current transmission power does not meet the target overlap, the TPC component may determine that the neighbor AP's current transmission power needs to increase in order to meet the target overlap. Once the 6 GHz radio is at its maximum transmission power, the TPC component may allow the 5 GHz radio to increase its transmission power beyond the in-band value. In general, however, the TPC component may prefer increasing the transmission power value in 6 GHz over increasing the 5 GHz transmission power, as roaming capabilities of 6 GHz clients may be better than roaming capabilities of 5 GHz clients. At sub-block 450, the TPC component saves the predicted transmission power of the second AP on the second band.

At block 406, the TPC component performs transmit power control for the second AP communicating on the second band in the second cell. Block 406 includes sub-blocks 460, 470, and 480. At sub-block 460, the TPC component determines in-band transmission power for the second AP communicating on the second band. For example, the TPC component may determine an in-band transmission power using a 6 GHz TPC control algorithm.

At sub-block 470, the TPC component compares the in-band transmission power for the second AP with the predicted transmission power of the second AP. For example, for the neighbor AP's 6 GHz radio, if the TPC component determines there is a saved predicted transmission power for the neighbor AP's 6 GHz radio, then the TPC component may compare the saved predicted transmission power with the in-band transmission power for the 6 GHz radio. At sub-block 480, the TPC component assigns the higher of the in-band transmission power and the predicted transmission power to the second AP.

In some embodiments, if neighboring AP(s)' radio(s) with integrated antennas operating on 6 GHz LPI mode does not offer enough coverage for MBBR, then the TPC component can select, based on the density of the MBBR, one or more of the neighboring AP(s)' radio(s) as candidates for SP mode in order to provide improved cell overlap with their adjacent neighbors in other bands.

Figure 5:
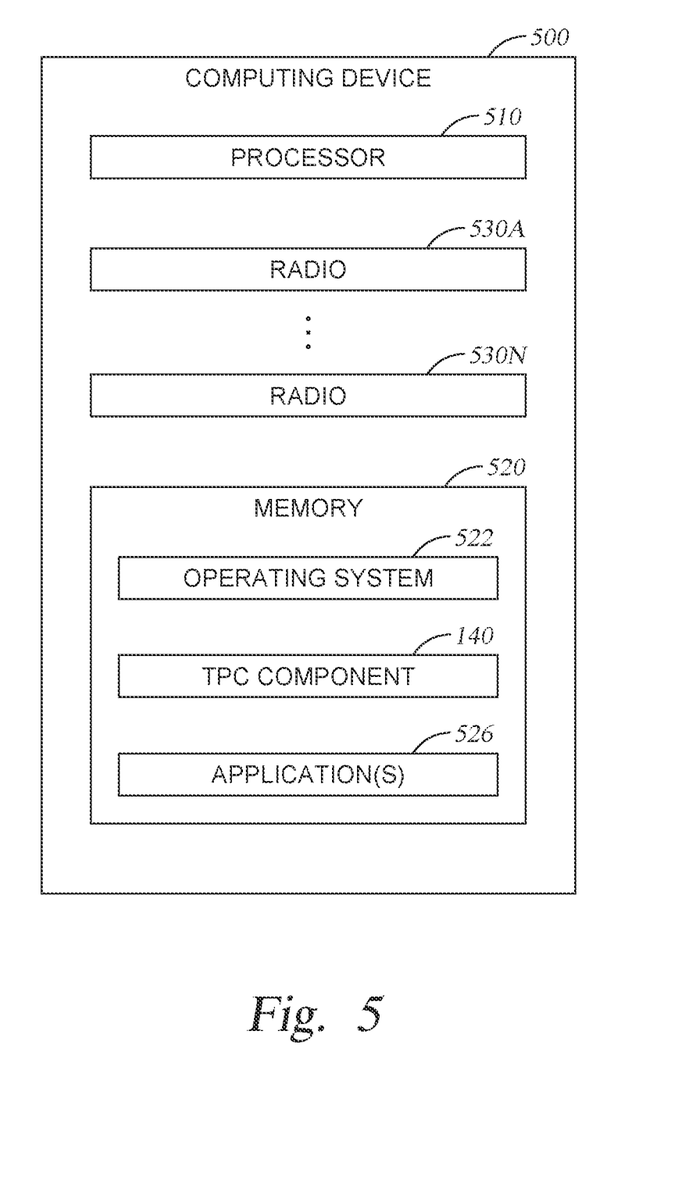
FIG. 5 illustrates an example computing device, according to one embodiment.

FIG. 5 illustrates an example computing device 500, according to one embodiment. The computing device 500 can be configured to perform one or more techniques described herein for performing transmit power control for facilitating MBBR deployments. For example, the computing device 500 can perform method 200, method 300, method 400, and any other techniques (or combination of techniques) described herein. The computing device 500 can be an AP (e.g., AP 102) or a controller (e.g., controller 130). The computing device 500 includes a processor 510, a memory 520, and one or more radios 530a-n (generally, radio 530).

The processor 510 may be any processing element capable of performing the functions described herein. The processor 510 represents a single processor, multiple processors, a processor with multiple cores, and combinations thereof. The communication interfaces 530 facilitate communications between the computing device 500 and other devices. The communications interfaces 530 are representative of wireless communications antennas and various wired communication ports. The memory 520 may be either volatile or non-volatile memory and may include RAM, flash, cache, disk drives, and other computer readable memory storage devices. Although shown as a single entity, the memory 520 may be divided into different memory storage elements such as RAM and one or more hard disk drives.

As shown, the memory 520 includes various instructions that are executable by the processor 510 to provide an operating system 522 to manage various functions of the computing device 500. As shown, the memory 520 includes the operation system 522, the TPC component 140, and one or more application(s) 526.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method comprising:
identifying a first access point communicating on a first band within a first cell;
identifying a second access point communicating on a second band within a second cell neighboring the first cell; and
creating a target overlap between the first band and the second band, wherein creating the target overlap comprises adjusting a size of the first cell based at least in part on (i) a first transmission power determined for the first access point based on a transmit power control performed for the first band and (ii) at least one predicted second transmission power for the second access point that will meet the target overlap between the first band and the second band.

2. The computer-implemented method of claim 1, wherein adjusting the size of the first cell comprises assigning a maximum of the first transmission power and the at least one predicted second transmission power to the first access point.

3. The computer-implemented method of claim 1, wherein the at least one predicted second transmission power comprises a respective predicted second transmission power that will meet the target overlap for each radio of the second access point.

4. The computer-implemented method of claim 1, wherein creating the target overlap further comprises adjusting a size of the second cell.

5. The computer-implemented method of claim 3, wherein adjusting the size of the second cell comprises:
determining a first transmission power for the second access point, based on performing transmit power control for the second band;
predicting a second transmission power for the first access point that will meet the target overlap between the first band and the second band; and assigning a maximum of the first transmission power for the second access point and the second transmission power for the first access point to the second access point.

6. The computer-implemented method of claim 1, wherein creating the target overlap comprises adjusting the size of the first cell and a size of the second cell at a same time.

7. The computer-implemented method of claim 1, wherein creating the target overlap further comprises:
performing channel assignment for the first band in the first cell, based at least in part on an operating mode of the second access point;
after performing the channel assignment, performing transmit power control for the first access point communicating on the first band in the first cell; and
performing transmit power control for the second access point communicating on the second band in the second cell, based in part on the transmit power control for the first access point.

8. The computer-implemented method of claim 7, wherein performing the channel assignment comprises:
determining a signal strength of the second access point when the operating mode of the second access point is low power indoor (LPI) mode; and
selecting one or more channels in the first band, based in part on the signal strength.

9. The computer-implemented method of claim 7, wherein performing the transmit power control for the first access point comprises:
determining an in-band transmission power for the first access point;
predicting a transmission power of the second access point that, when combined with the in-band transmission power, will achieve the target overlap between the first band and the second band; and
saving the predicted transmission power.

10. The computer-implemented method of claim 9, wherein performing the transmit power control for the second access point comprises:
determining an in-band transmission power for the second access point; and
assigning a higher of the in-band transmission power for the second access point and the predicted transmission power of the second access point to the second access point.

11. The computer-implemented method of claim 1, wherein the target overlap is based on a type of client device being served by at least one of the first access point or the second access point.

12. The computer-implemented method of claim 11, wherein the type of client device is one of a plurality of client types comprising a single radio multi-link device, a simultaneous transmission and reception (STR) multi-link device, and a non-STR multi-link device.

13. A system comprising:
a memory; and
a processor communicatively coupled to the memory, the processor being configured to perform an operation comprising:
identifying a first access point communicating on a first band within a first cell;
identifying a second access point communicating on a second band within a second cell neighboring the first cell; and
creating a target overlap between the first band and the second band, wherein creating the target overlap comprises adjusting a size of the first cell based at least in part on (i) a first transmission power determined for the first access point based on a transmit power control performed for the first band and (ii) at least one predicted second transmission power for the second access point that will meet the target overlap between the first band and the second band.

14. The system of claim 13, wherein adjusting the size of the first cell comprises assigning a maximum of the first transmission power and the at least one predicted second transmission power to the first access point.

15. The system of claim 13, wherein creating the target overlap further comprises:
performing channel assignment for the first band in the first cell, based at least in part on an operating mode of the second access point;
after performing the channel assignment, performing transmit power control for the first access point communicating on the first band in the first cell; and
performing transmit power control for the second access point communicating on the second band in the second cell, based in part on the transmit power control for the first access point.

16. The system of claim 15, wherein performing the channel assignment comprises:
determining a signal strength of the second access point when the operating mode of the second access point is low power indoor (LPI) mode; and
selecting one or more channels in the first band, based in part on the signal strength.

17. The system of claim 16, wherein:
performing the transmit power control for the first access point comprises:
determining an in-band transmission power for the first access point;
predicting a transmission power of the second access point that, when combined with the in-band transmission power, will achieve the target overlap between the first band and the second band; and
saving the predicted transmission power; and
performing the transmit power control for the second access point comprises:
determining an in-band transmission power for the second access point; and
assigning a higher of the in-band transmission power for the second access point and the predicted transmission power of the second access point to the second access point.

18. A non-transitory computer-readable storage medium comprising computer executable code, which when executed by one or more processors, performs an operation comprising:
identifying a first access point communicating on a first band within a first cell;
identifying a second access point communicating on a second band within a second cell neighboring the first cell; and
creating a target overlap between the first band and the second band, wherein creating the target overlap comprises adjusting a size of the first cell based at least in part on (i) a first transmission power determined for the first access point based on a transmit power control performed for the first band and (ii) at least one predicted second transmission power for the second access point that will meet the target overlap between the first band and the second band.

19. The non-transitory computer-readable storage medium of claim 18, wherein adjusting the size of the first cell comprises assigning a maximum of the first transmission power and the at least one predicted second transmission power to the first access point.

20. The non-transitory computer-readable storage medium of claim 18, wherein the at least one predicted second transmission power comprises a respective predicted second transmission power that will meet the target overlap for each radio of the second access point.

* * * * *